(12) United States Patent
Yeh et al.

(10) Patent No.: US 9,575,399 B2
(45) Date of Patent: Feb. 21, 2017

(54) PROJECTOR

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Zhi-Jian Peng, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 60 days.

(21) Appl. No.: 14/789,282

(22) Filed: Jul. 1, 2015

(65) Prior Publication Data
US 2016/0363843 A1    Dec. 15, 2016

(30) Foreign Application Priority Data
Jun. 12, 2015 (CN) .......................... 2015 1 0321817

(51) Int. Cl.
*G03B 21/16* (2006.01)
*H04N 9/31* (2006.01)
*G03B 21/14* (2006.01)

(52) U.S. Cl.
CPC ............. *G03B 21/16* (2013.01); *G03B 21/145* (2013.01); *H04N 9/3144* (2013.01)

(58) Field of Classification Search
CPC ....... G03B 21/16; G03B 21/145; G03B 21/14; H04N 9/3144; H04N 9/3141
See application file for complete search history.

(56) References Cited

U.S. PATENT DOCUMENTS

| | | | | |
|---|---|---|---|---|
| 6,739,831 B2 * | 5/2004 | Hsu | ...................... | F04D 29/545 353/58 |
| 2006/0146293 A1 * | 7/2006 | Morimoto | .............. | G03B 21/16 353/61 |
| 2011/0032490 A1 * | 2/2011 | Hsiao | ..................... | G03B 21/16 353/58 |

\* cited by examiner

*Primary Examiner* — William C Dowling
*Assistant Examiner* — Ryan Howard
(74) *Attorney, Agent, or Firm* — Zhigang Ma

(57) ABSTRACT

A projector includes a shell, a projection lens, an optical engine module, a power supply module a light source module and a fan. The shell defines an air inlet, an air outlet and forms a first room, a second room and a third room. The first room and the second room communicate with the air inlet. The third room communicates with the air outlet. The projection lens and the optical engine module are positioned in the first room. The power supply module is positioned in the second room. The light source module is positioned in the third room. Heated air in the first room can flows to the second room. Heated air in the second room can flows to the third room. The fan is positioned in the third room to expel heated air from within the shell.

20 Claims, 4 Drawing Sheets

PROJECTOR

CROSS-REFERENCE TO RELATED APPLICATIONS

This application claims priority to Chinese Patent Application No. 201510321817.3, filed on Jun. 12, 2015 the contents of which are incorporated by reference herein.

FIELD

The subject matter herein generally relates to a projector.

BACKGROUND

Projectors generate heat during operation. A number of fans attached in the projector to dissipate the heat, which makes a lot of noise.

BRIEF DESCRIPTION OF THE DRAWINGS

Implementations of the present technology will now be described, by way of example only, with reference to the attached figures.

DETAILED DESCRIPTION

Figure 1:
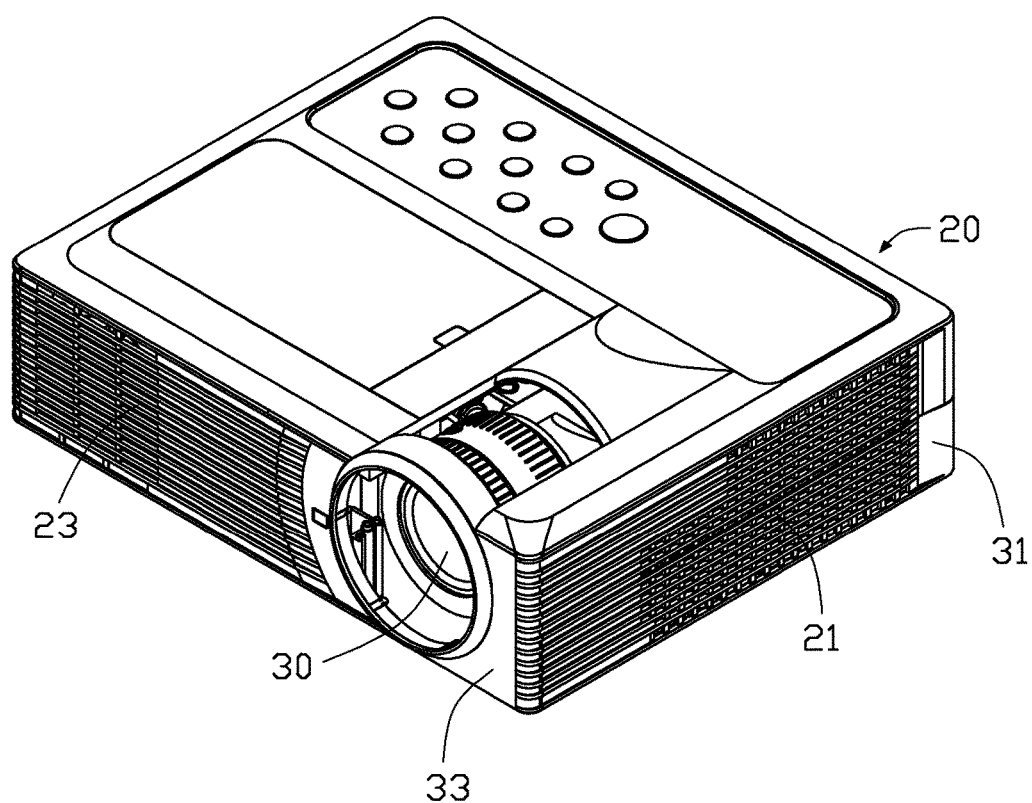
FIG. 1 is an isometric view of a projector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
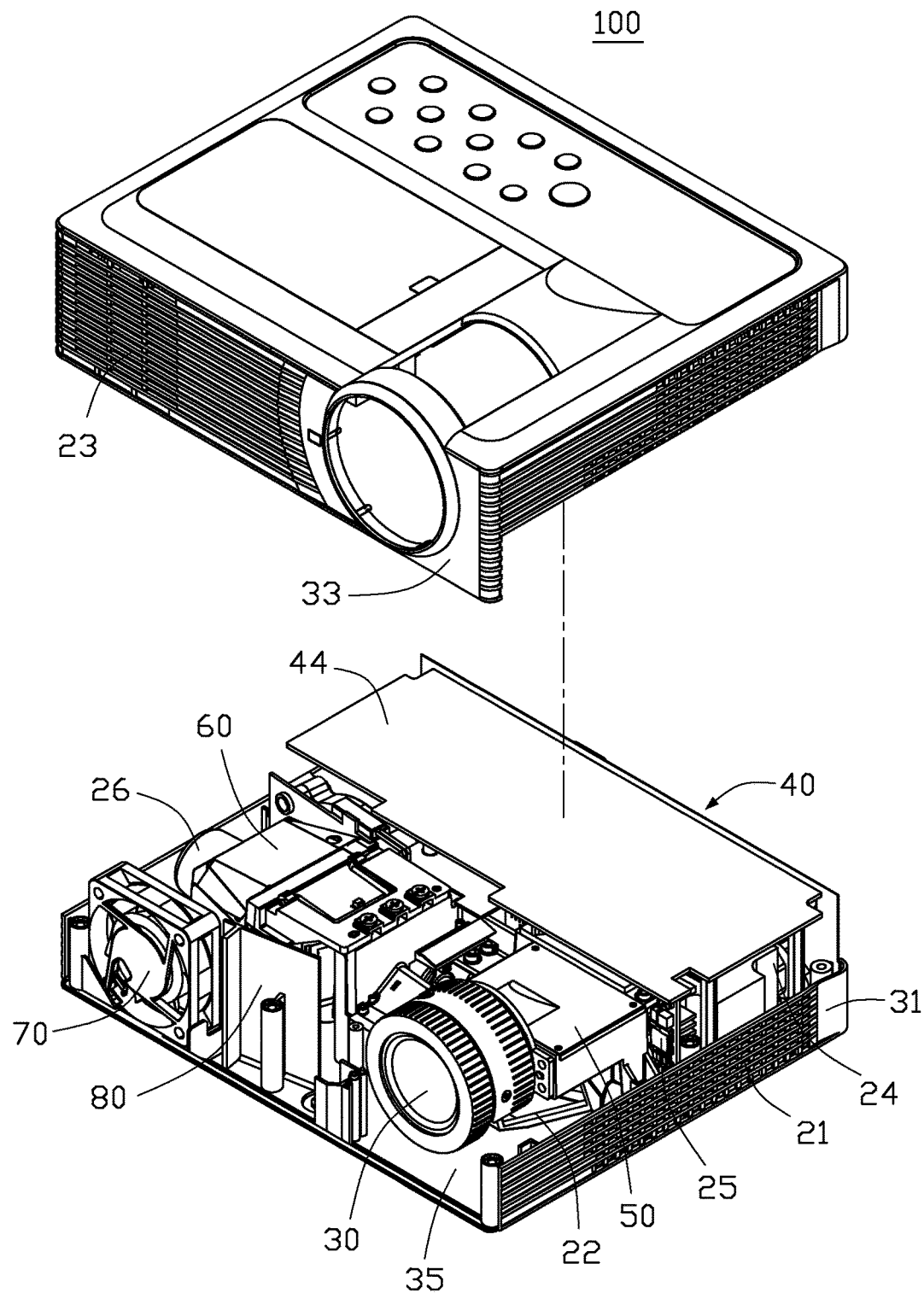
FIG. 2 is an exploded isometric view of part of the projector of FIG. 1.

FIG. 1 illustrates a projector 100 includes a shell 20 and a projection lens 30. The shell 20 includes a first wall 31 and a second wall 33 perpendicularly attached to the first wall 31. The first wall 31 defines an air inlet 21. The second wall 33 defines an air outlet 23. FIG. 2 illustrates the projector 100 further includes a power supply module 40, an optical engine module 50, a light source module 60 and a fan 70. The shell 20 defines a first space 22, a second space 24 and a third space 26. The projection lens 30 is positioned in the first space 22 and extends out of the shell 20. The optical engine module 50 is also positioned in the first space 22. The power supply module 40 is positioned in the second space 24. The light source module 60 and the fan 70 are positioned in the third space 26.

The first space 22 and the second space 24 communicate with the air inlet 21. The third space 24 communicates with the air outlet 23. A first vent 25 is defined between the first space 22 and the second space 24. The heat generated by the optical engine module 50 during operation flows from the first space 22 to the second space 24 through the first vent 25. A second vent 27 is defined between the second space 24 and the third space 26. The heat generated by the power supply module 40 during operation flows from the second space 24 to the third space 26 through the second vent 27. The heat in the third space 26 is dispersed out of the shell 20 by the fan 70.

The shell 20 further includes a bottom plate 35 perpendicularly attached to the first wall 31 and a second wall 33. The air inlet 21 is defined the first wall 31. The air outlet 23 is defined the second wall 33. The power supply module 40, the optical engine module 50, the light source module 60 and the fan 70 are all attached to the bottom plate 35. The projection lens 30 is attached to the optical engine module 50. The projection lens 30 is parallel to the first wall 31. The light source module 60 is attached to the optical engine module 50. The projection lens 30, the optical engine module 50 and the light source module 60 are formed L shaped.

Figure 3:
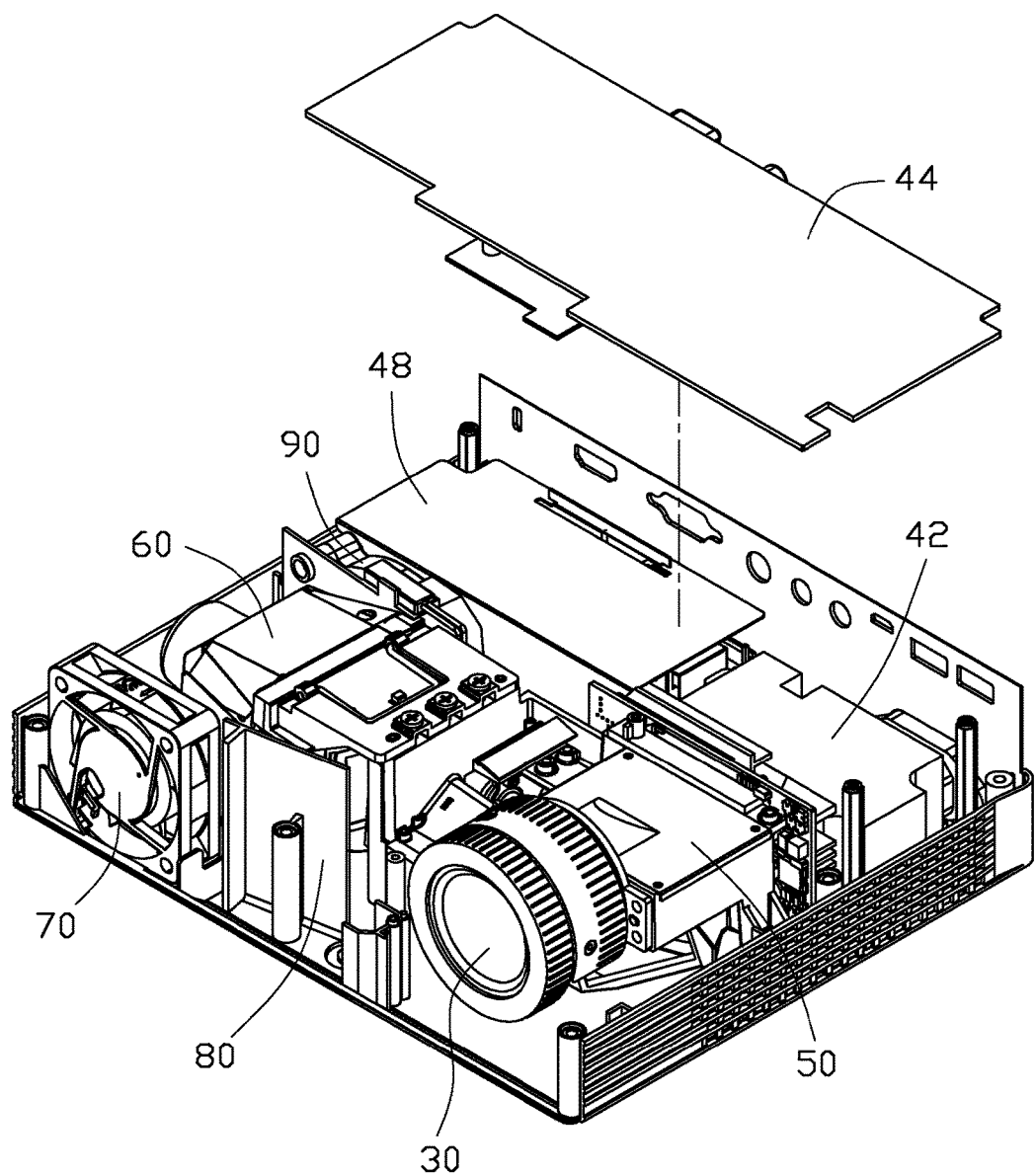
FIG. 3 is an exploded isometric view of the projector of FIG. 2.
Figure 4:
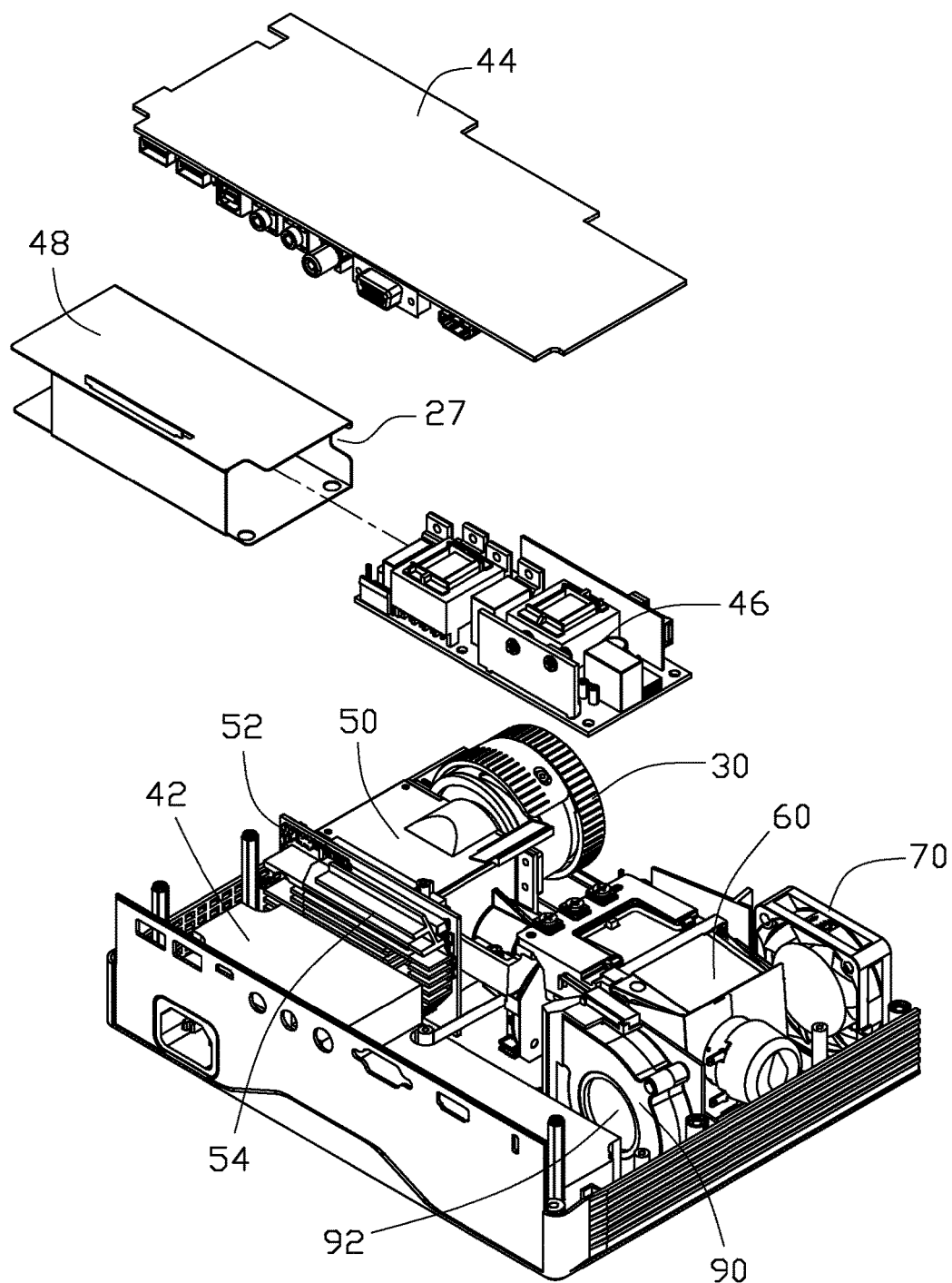
FIG. 4 is an exploded isometric view of the projector of FIG. 3.

FIG. 3 illustrates that the power supply module 40 includes a power module 42 and a power board 44. The power module 42 is attached to the bottom plate 35. A wind scooper 48 is positioned on the power module 42 and covers a part of the power module 42. FIG. 4 illustrates that the power supply module 40 further includes a transformer module 46. The transformer module 46 is positioned in the wind scooper 48. The power board 44 is positioned on the wind scooper 48 and covers other part of the power module 42.

The optical engine module 50 includes a control board 52. The control board 52 is perpendicularly attached to the bottom plate 35. A side of the control board 52 away from the bottom plate 35 touches the power board 44 to make the shell 20, the power module 42, the power board 44, the wind scooper 48 and the control board 52 defines the second space 24. Cooling fins 54 are attached to a side of the control board 52 opposite to the power module 42. The second vent 27 is defined on a side of an end of the wind scooper 48 away from the first wall 31. An air blower 90 is attached in the third space 26. The air blower 90 includes a suction outlet 92 opposite to the second vent 27 to suction the heat in the second space 24 to the third space 26.

FIG. 3 illustrates that an air guiding plate 80 is attached to the bottom plate 35. The air guiding plate 80 is obliquely positioned between the fan 70 and the light source module 60 and adjacent to the light source module 60 to guide the air in the third space to the fan 70.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A projector comprising:
a shell defining an air inlet, an air outlet, a first space, a second space and a third space, the first space and the second space communicating with the air inlet, the third space communicating with the air outlet, the shell further defining a first vent between the first space and the second space, and a second vent between the second space and the third space;
a projection lens positioned in the first space and at least partially exposed out of the shell;
an optical engine module attached to the projection lens and positioned in the first space, the optical engine module configured such that heated air generated by the optical engine module flows from the first space to the second space, through the first vent;
a power supply module positioned in the second space, the power supply module configured such that heated air generated by the power supply flows from the second space to the third space, through the second vent;
a light source module attached to the optical engine module and positioned in the third space; and
a fan positioned in the third space, the fan configured to expel heated air from within the shell.

2. The projector as claimed in claim 1, wherein the shell comprises a first wall, a second wall perpendicularly attached to the first wall, the air inlet is defined on the first wall, the air outlet is defined on the second wall.

3. The projector as claimed in claim 2, wherein the projection lens is parallel to the first wall, the projection lens, the optical engine module and the light source module are formed L shaped.

4. The projector as claimed in claim 2, wherein the shell further comprises a bottom plate perpendicular to the first wall and the second wall.

5. The projector as claimed in claim 4, wherein the power supply module comprises a power module, a power board and a transformer module, the power module is attached to the bottom plate, a wind scooper is positioned on the power module and covers a part of the power module, the transformer module is positioned in the wind scooper, the power board is positioned on the wind scooper and covers other part of the power module.

6. The projector as claimed in claim 5, wherein the second vent is defined on a side of an end of the wind scooper away from the first wall.

7. The projector as claimed in claim 4, wherein the optical engine module comprises a control board, the control board is perpendicularly attached to the bottom plate, a side of the control board away from the bottom plate touches the power board.

8. The projector as claimed in claim 7, wherein the control board comprises cooling fins attached to a side of the control board opposite to the power module.

9. The projector as claimed in claim 1, wherein an air blower is attached in the third space, the air blower comprises a suction outlet opposite to the second vent to suction the heat in the second space to the third space.

10. The projector as claimed in claim 1, wherein an air guiding plate is attached to the bottom plate, the air guiding plate is obliquely positioned between the fan and the light source module and adjacent to the light source module.

11. A projector comprising:
a shell defining an air inlet, an air outlet and forming a first room, a second room and a third room, the first room and the second room communicating with the air inlet, the third room communicating with the air outlet, the shell further defining a first vent between the first room and the second room, and a second vent between the second room and a third room;
a projection lens positioned in the first room and at least partially exposed out of the shell;
an optical engine module attached to the projection lens and positioned in the first room, heated air in the first room flows to the second room through the first vent;
a power supply module positioned in the second room, heated air in the second room flows to the third room through the second vent;
a light source module attached to the optical engine module and positioned in the third room; and
a fan positioned in the third room, the fan configured to expel heated air from within the shell.

12. The projector as claimed in claim 11, wherein the shell comprises a first wall, a second wall perpendicularly attached to the first wall, the air inlet is defined on the first wall, the air outlet is defined on the second wall.

13. The projector as claimed in claim 12, wherein the projection lens is parallel to the first wall, the projection lens, the optical engine module and the light source module are formed L shaped.

14. The projector as claimed in claim 12, wherein the shell further comprises a bottom plate perpendicular to the first wall and the second wall.

15. The projector as claimed in claim 14, wherein the power supply module comprises a power module, a power board and a transformer module, the power module is attached to the bottom plate, a wind scooper is positioned on the power module and covers a part of the power module, the transformer module is positioned in the wind scooper, the power board is positioned on the wind scooper and covers other part of the power module.

16. The projector as claimed in claim 15, wherein the second vent is defined on a side of an end of the wind scooper away from the first wall.

17. The projector as claimed in claim 14, wherein the optical engine module comprises a control board, the control board is perpendicularly attached to the bottom plate, a side of the control board away from the bottom plate touches the power board.

18. The projector as claimed in claim 17, wherein the control board comprises cooling fins attached to a side of the control board opposite to the power module.

19. The projector as claimed in claim 11, wherein an air blower is attached in the third room, the air blower comprises a suction outlet opposite to the second vent to suction the heat in the second room to the third room.

20. The projector as claimed in claim 11, wherein an air guiding plate is attached to the bottom plate, the air guiding plate is obliquely positioned between the fan and the light source module and adjacent to the light source module.

* * * * *